(12) United States Patent
Lu et al.

(10) Patent No.: US 11,264,606 B2
(45) Date of Patent: Mar. 1, 2022

(54) METHODS TO STABILIZE LITHIUM TITANATE OXIDE (LTO) BY SURFACE COATING

(71) Applicant: GM GLOBAL TECHNOLOGY OPERATIONS LLC, Detroit, MI (US)

(72) Inventors: Peng Lu, Santa Clara, CA (US); Michael P. Balogh, Novi, MI (US); Zhiqiang Yu, Shanghai (CN); Haijing Liu, Shanghai (CN); Daad B. Haddad, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 251 days.

(21) Appl. No.: 16/491,460

(22) PCT Filed: Mar. 13, 2017

(86) PCT No.: PCT/CN2017/076454
§ 371 (c)(1),
(2) Date: Sep. 5, 2019

(87) PCT Pub. No.: WO2018/165825
PCT Pub. Date: Sep. 20, 2018

(65) Prior Publication Data
US 2020/0035998 A1    Jan. 30, 2020

(51) Int. Cl.
*H01M 4/13915*  (2010.01)
*H01M 4/1315*   (2010.01)
*H01M 4/36*     (2006.01)
*H01M 4/485*    (2010.01)
*H01M 10/0525*  (2010.01)
*H01M 10/0568*  (2010.01)
*H01M 4/02*     (2006.01)

(52) U.S. Cl.
CPC ..... *H01M 4/13915* (2013.01); *H01M 4/1315* (2013.01); *H01M 4/366* (2013.01); *H01M 4/485* (2013.01); *H01M 10/0525* (2013.01); *H01M 10/0568* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,168,019 | A | 12/1992 | Sugeno |
| 8,399,138 | B2 | 3/2013 | Timmons |
| 8,420,259 | B2 | 4/2013 | Xiao et al. |
| 8,440,350 | B1 | 5/2013 | Verbrugge et al. |
| 8,642,201 | B2 | 2/2014 | Cheng et al. |
| 8,658,295 | B2 | 2/2014 | Cheng et al. |
| 8,679,680 | B2 | 3/2014 | Vanimisetti et al. |
| 8,828,481 | B2 | 9/2014 | Burton et al. |
| 8,835,056 | B2 | 9/2014 | Xiao et al. |
| 9,012,075 | B2 | 4/2015 | Verbrugge et al. |
| 9,034,519 | B2 | 5/2015 | Xiao et al. |
| 9,059,451 | B2 | 6/2015 | Xiao et al. |
| 9,093,705 | B2 | 7/2015 | Xiao et al. |
| 9,142,830 | B2 | 9/2015 | Xiao et al. |
| 9,362,551 | B2 | 6/2016 | Sachdev et al. |
| 9,362,552 | B2 | 6/2016 | Sohn et al. |
| 9,531,004 | B2 | 12/2016 | Xiao et al. |
| 9,583,767 | B2 | 2/2017 | Verbrugge et al. |
| 10,164,245 | B2 | 12/2018 | Huang |
| 10,326,136 | B2 | 6/2019 | Xiao et al. |
| 2003/0077517 | A1 | 4/2003 | Nakanishi et al. |
| 2007/0048617 | A1* | 3/2007 | Inda ............ C03C 4/18 429/304 |
| 2009/0253042 | A1 | 10/2009 | Sun et al. |
| 2010/0143790 | A1 | 6/2010 | Inagaki et al. |
| 2011/0076557 | A1* | 3/2011 | Ishii ............ B60L 58/25 429/199 |
| 2012/0028113 | A1* | 2/2012 | Huang ............ H01M 4/366 429/209 |
| 2012/0100403 | A1 | 4/2012 | Wang et al. |

(Continued)

FOREIGN PATENT DOCUMENTS

| | | |
|---|---|---|
| CN | 110603672 A | 12/2019 |
| CN | 110603679 A | 12/2019 |
| DE | 112017007079 T5 | 11/2019 |
| DE | 112017007080 T5 | 12/2019 |
| JP | 2016143642 A | 8/2016 |
| WO | 2018023527 A1 | 2/2018 |
| WO | 2018165825 A1 | 9/2018 |
| WO | 2018165824 A1 | 9/2019 |

OTHER PUBLICATIONS

International Search Report and Written Opinion for International Application No. PCT/CN2017/076453 dated Aug. 28, 2017, 6 pages (ISA/CN).

(Continued)

*Primary Examiner* — Anca Eoff
(74) *Attorney, Agent, or Firm* — Harness, Dickey & Pierce, P.L.C.

(57) ABSTRACT

Methods of pretreating an electroactive material comprising lithium titanate oxide (LTO) include contacting a surface of the electroactive material with a pretreatment composition. In one variation, the pretreatment composition includes a salt of lithium fluoride salt selected from the group consisting of: lithium hexafluorophosphate (LiPF$_6$), lithium tetrafluoroborate (LiBF$_4$), and combinations thereof, and a solvent. In another variation, the pretreatment composition includes an organophosphorus compound. In this manner, a protective surface coating forms on the surface of the electroactive material. The protective surface coating comprises fluorine, oxygen, phosphorus or boron, as well as optional elements such as carbon, hydrogen, and listed metals, and combinations thereof.

20 Claims, 4 Drawing Sheets

(56) References Cited

U.S. PATENT DOCUMENTS

| | | | | |
|---|---|---|---|---|
| 2012/0164535 | A1* | 6/2012 | Huang | H01M 4/625 |
| | | | | 429/231.1 |
| 2012/0328927 | A1 | 12/2012 | Timmons et al. | |
| 2013/0099159 | A1 | 4/2013 | Halalay et al. | |
| 2014/0038059 | A1* | 2/2014 | Li | H01M 10/052 |
| | | | | 429/330 |
| 2014/0113197 | A1 | 4/2014 | Xiao et al. | |
| 2014/0377657 | A1 | 12/2014 | Lim et al. | |
| 2015/0372348 | A1 | 12/2015 | Buqa et al. | |
| 2016/0308217 | A1 | 10/2016 | Liu et al. | |
| 2016/0351910 | A1* | 12/2016 | Albano | H01M 4/587 |
| 2017/0098817 | A1 | 4/2017 | Yu et al. | |
| 2017/0222272 | A1* | 8/2017 | Takami | H01M 50/20 |
| 2018/0269528 | A1* | 9/2018 | Zhang | H01M 4/505 |
| 2018/0358656 | A1 | 12/2018 | Deng | |
| 2018/0366771 | A1 | 12/2018 | Deng | |
| 2020/0020939 | A1 | 1/2020 | Lu et al. | |

OTHER PUBLICATIONS

International Search Report and Written Opinion for International Application No. PCT/CN2017/076454 dated Dec. 22, 2017, 7 pages (ISA/CN).

English language machine translation provided by Espacenet for CN 110603672 A. As noted below, this is a publication of counterpart Chinese Patent Application No. 201780090695.9 to the present application.

English language machine translation provided by Espacenet for DE 112017007080 T5. As noted below, this is a publication of counterpart German Patent Application No. 112017007080.5 to the present application.

English language machine translation provided by Espacenet for CN 110603679 A. As noted below, this is a publication of Chinese Patent Application No. 201780090709.7.

English language machine translation provided by Espacenet for DE 112017007079 T5. As noted below, this is a publication of German Patent Application No. 112017007079.1.

CN 110603672 A is a publication of counterpart Chinese Patent Application No. 201780090695.9 to the present application.

DE 112017007080 T5 is a publication of counterpart German Patent Application No. 112017007080.5 to the present application.

CN 110603679 A is a publication of Chinese Patent Application No. 201780090709.7.

DE 112017007079 T5 is a publication of German Patent Application No. 112017007079.1.

U.S. Appl. No. 16/491,488, filed Sep. 5, 2019, Peng Lu.

U.S. National Phase Application of PCT/CN2017/076453, Sep. 5, 2019, Peng Lu et al., Methods to Stabilize Lithium Titanate (LTO) by Electrolyte Pretreatment.

* cited by examiner

METHODS TO STABILIZE LITHIUM TITANATE OXIDE (LTO) BY SURFACE COATING

CROSS-REFERENCE TO RELATED APPLICATIONS

This application is a U.S. National Phase Application under 35 U.S.C. 371 of International Application No. PCT/CN2017/076454 filed on Mar. 13, 2017 and published in English as WO 2018/165825 A1 on Sep. 20, 2018. The entire disclosure of the above application is incorporated herein by reference.

INTRODUCTION

This section provides background information related to the present disclosure which is not necessarily prior art.

The present disclosure relates to protective coatings for lithium titanate oxide (LTO) electroactive materials that suppress gas generation for use in electrochemical devices and improves electrochemical cell usage, methods for making such coatings, and methods for use thereof.

High-energy density, electrochemical cells, such as lithium-ion batteries can be used in a variety of consumer products and vehicles. Typical lithium-ion batteries comprise a first electrode, such as a positive electrode or cathode, a second electrode such as a negative electrode or an anode, an electrolyte material, and a separator. Often a stack of lithium-ion battery cells are electrically connected to increase overall output. Conventional lithium-ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

The negative electrode typically includes a lithium insertion material or an alloy host material. Typical electroactive materials for forming an anode include lithium-graphite intercalation compounds, lithium-silicon intercalation compounds, lithium alloys and lithium titanate $Li_{4+x}Ti_5O_{12}$, where $0 \leq x \leq 3$, such as $Li_4Ti_5O_{12}$ (LTO), which may be a nano-structured LTO. LTO is a particularly desirable negative electrode battery. LTO desirably has certain advantages, like high cut voltage (e.g., cut-off potentials relative to a lithium metal reference potential) that desirably minimizes or avoids solid electrolyte interface (SEI) formation. Furthermore, LTO is a zero-strain material having minimal volumetric change during lithium insertion and deinsertion, thus enabling long term cycling stability, high current efficiency, and high rate capabilities. Such long term cycling stability, high current efficiency, and high rate capabilities are particularly advantageous for power battery and start-stop battery use.

However, while LTO is a promising anode material for high power lithium-ion batteries, providing extremely long life and high tolerance to overcharge and thermal abuse, in certain circumstances, when used with certain cathode materials and electrolytes, LTO may potentially have certain disadvantages. For example, $Li_{4+x}Ti_5O_{12}$ can generate significant quantities of gas, which mainly includes hydrogen, within a battery cell especially at elevated temperature conditions under charging state. Thus, batteries incorporating LTO negative electrodes may be subjected to a high temperature aging process to reduce gas formation and improve long-term capacity retention. For example, a battery having an LTO electrode can be aged at about 70° C. for a week under applied potential at 100% state of charge (SOC) in one exemplary high temperature aging process. However, high temperature aging can reduce initial battery capacity by about 10% or more. It would be desirable to improve LTO anode materials to suppress gas formation without requiring such aging processes to employ the desirable aspects of the LTO material that provide durable batteries with sustained high capacity, high discharge rates, and long life.

SUMMARY

This section provides a general summary of the disclosure, and is not a comprehensive disclosure of its full scope or all of its features.

In certain variations, the present disclosure relates to a method of making an electroactive material for an electrochemical cell. The method optionally includes pretreating an electroactive material including $Li_{(4+x)}Ti_5O_{12}$ (LTO), where $0 \leq x \leq 3$. The pretreating can include contacting a surface of the electroactive material with a pretreatment composition. The pretreatment composition includes a salt of lithium fluoride salt selected from the group consisting of: lithium hexafluorophosphate ($LiPF_6$), lithium tetrafluoroborate ($LiBF_4$), and combinations thereof. The pretreatment composition may also include a solvent. The pretreating thus forms a protective surface coating on the surface of the electroactive material. The protective surface coating includes fluorine, oxygen, and at least one element selected from the group consisting of: phosphorus, boron, and combinations thereof.

In one aspect, the protective surface coating includes a first compound represented by $P_xO_yF_z$, a second compound represented by $M_aP_xO_yF_z$, or a combination of the first compound and the second compound. In the first compound and the second compound, when P in the formula is normalized to 1 so that x is equal to about 1, $0<y\leq4$, $0<z\leq6$, $0<a\leq3$, and M is selected from the group of elements: lithium (Li), sodium (Na), potassium (K), magnesium (Mg), calcium (Ca), barium (Ba), titanium (Ti), aluminum (Al), and combinations thereof.

In one aspect, the protective surface coating including the first compound represented by $P_xO_yF_z$, the second compound represented by $M_aP_xO_yF_z$, or a combination of the first compound and the second compound further includes titanium tetrafluoride ($TiF_4$).

In one aspect, the protective surface coating includes the first compound represented by $P_xO_yF_z$ including fluorine (F) at greater than or equal to about 19% by weight to less than or equal to about 67% by weight.

In one aspect, the protective surface coating includes the second compound represented by $M_aP_xO_yF_z$ including fluorine (F) at greater than or equal to about 6% by weight to less than or equal to about 59% by weight.

In one aspect, the protective surface coating includes a compound represented by $B_xO_yF_z$, when B is normalized to 1 so that x is equal to about 1, $0<y\leq4$, and $0<z\leq4$.

In one aspect, the protective surface coating including a compound represented by $B_xO_yF_z$ further includes titanium tetrafluoride ($TiF_4$).

In one aspect, the lithium fluoride salt is present in the pretreatment composition at greater than or equal to about 0.1% by weight to less than or equal to about 15% by weight.

In one aspect, the pretreating to form the protective surface coating occurs without any applied electric potential or current.

In one aspect, the electroactive material may be in a form of a plurality of LTO particles. The pretreating may include mixing the plurality of LTO particles with the pretreatment composition. After the protective coating is formed on the surface, the plurality of LTO particles is used to form a negative electrode.

In one aspect, the LTO is contained in a pre-fabricated electrode layer. The pretreating includes applying the pretreatment composition to at least one exposed surface of the pre-fabricated electrode layer. The protective coating is formed on exposed surfaces of the LTO in the pre-fabricated electrode layer.

In another variation, the present disclosure relates to a method of making an electroactive material for an electrochemical cell. The method includes pretreating an electroactive material including $Li_{(4+x)}Ti_5O_{12}$ (LTO), where $0 \leq x \leq 3$, by contacting a surface of the electroactive material with a pretreatment composition. The pretreatment composition includes an organophosphorus compound represented by $M_aP_xO_yF_zC_nH_m$, wherein when x is equal to about 1, $0 \leq a \leq 3$, $0 < y \leq 4$, $0 \leq z \leq 6$, $0 \leq n \leq 20$, $0 \leq m \leq 42$, and M is selected from the group of elements: lithium (Li), sodium (Na), potassium (K), magnesium (Mg), calcium (Ca), barium (Ba), titanium (Ti), aluminum (Al), and combinations thereof to form a protective surface coating on the surface. The protective surface coating includes, oxygen, phosphorus carbon, and hydrogen.

In one aspect, the organophosphorus compound is selected from the group consisting of: perfluorinated phosphonic acid, methylallyl phosphate, alkyl fluorophosphates, phosphated poly(methyl methacrylate) (PMMA), phosphonated polyimides, (aminomethyl)phosphonic acid, lithium meta phosphate, adenosine diphosphate, phospholipids, and combinations thereof.

In one aspect, the protective surface coating is represented by $P_xO_yF_zC_nH_m$, when P is normalized to 1 so that x is equal to about 1, where $0 < y \leq 4$, $0 < z \leq 6$, $0 < n \leq 20$, and $0 \leq m \leq 42$.

In one aspect, the organophosphorus compound is represented by $P_xO_yF_zC_nH_m$ including fluorine (F) at greater than or equal to about 4% by weight to less than or equal to about 50% by weight.

In one aspect, the organophosphorus compound is present in the pretreatment composition at greater than or equal to about 0.1% by weight to less than or equal to about 15% by weight.

In one aspect, the pretreating to form the protective surface coating occurs without any applied electric potential.

In one aspect, the electroactive material is:

(i) in a form of a plurality of LTO particles. The pretreating includes mixing the plurality of LTO particles with the pretreatment composition. The protective coating is formed on the surface and the plurality of LTO particles is used to form a negative electrode; or (ii) contained in a pre-fabricated electrode layer. The pretreating includes applying the pretreatment composition to at least one exposed surface of the pre-fabricated electrode layer.

In certain other variations, the present disclosure relates to an electroactive material for an electrochemical cell including $Li_{(4+x)}Ti_5O_{12}$, where $0 \leq x \leq 3$ (LTO), and a protective surface coating formed thereon. The protective surface coating includes a compound represented by $M_aP_xO_yF_zC_nH_m$, wherein when x is equal to about 1, $0 \leq a \leq 3$, $0 < y \leq 4$, $0 < z \leq 6$, $0 \leq n \leq 20$, $0 \leq m \leq 42$, and M is selected from the group of elements: lithium (Li), sodium (Na), potassium (K), magnesium (Mg), calcium (Ca), barium (Ba), titanium (Ti), aluminum (Al), and combinations thereof.

In one aspect, a lithium-ion electrochemical cell includes the electroactive material as a negative electrode and further includes a positive electrode, a separator, and an electrolyte including lithium hexafluorophosphate ($LiPF_6$), lithium tetrafluoroborate ($LiBF_4$), and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
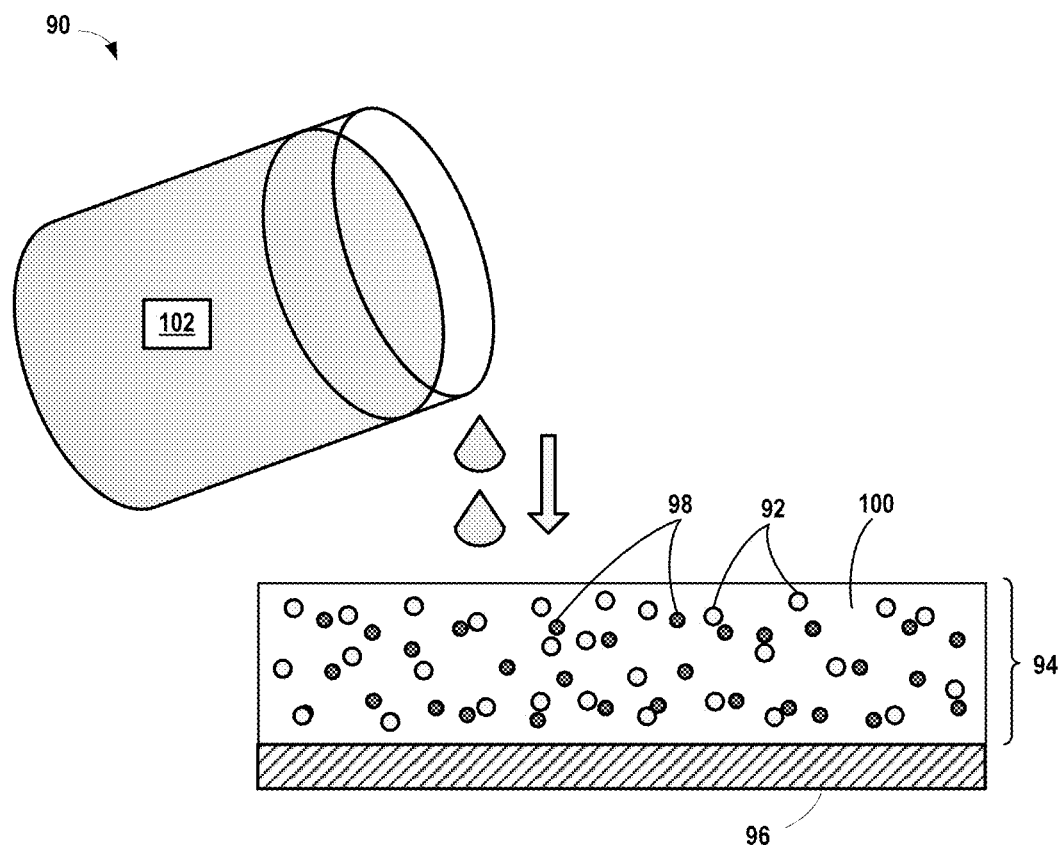
Figure 5:
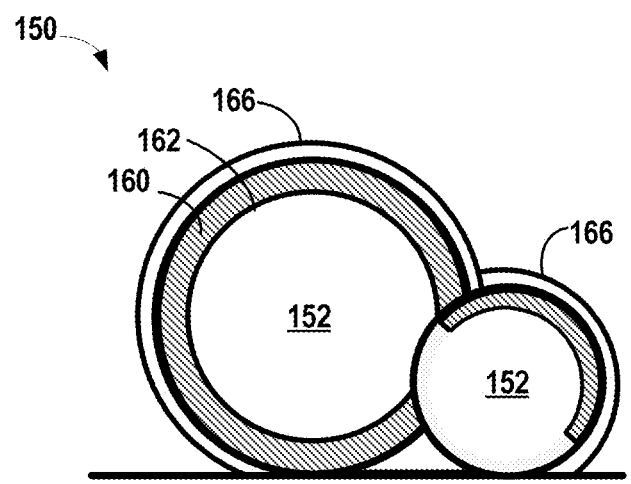

FIG. 4 is a schematic showing a simplified process for pretreating a pre-fabricated electrode having an electroactive material comprising lithium titanate oxide (LTO) to have a protective coating according to certain aspects of the present disclosure; and FIG. 5 is a schematic showing a plurality of electroactive material particles comprising lithium titanate oxide (LTO) having a multilayered protective coating applied according to certain aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical compound, but which may also comprise additional substances or compounds, including impurities.

Example embodiments will now be described more fully with reference to the accompanying drawings.

Figure 1:
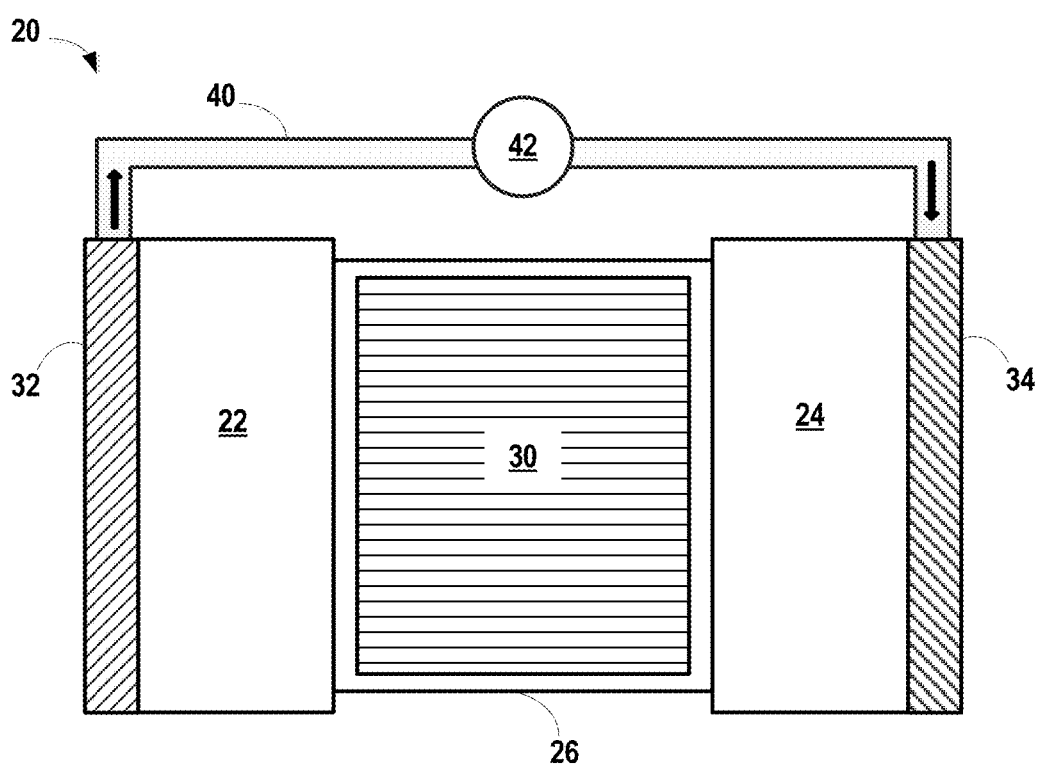
FIG. 1 is a schematic of an exemplary electrochemical battery for purposes of illustration.

An exemplary illustration of a lithium-ion battery 20 is shown in FIG. 1. Lithium-ion battery 20 includes a negative electrode 22, a positive electrode 24, and a separator 30 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the lithium-ion battery 20.

The lithium-ion battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the intercalated lithium in the negative electrode 22 is depleted and the capacity of the lithium-ion battery 20 is diminished.

The lithium-ion battery 20 can be charged or re-powered at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator. In many lithium-ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium-ion battery 20 can include a variety of other components that while not depicted here are nonetheless known to those of skill in the art. For instance, the lithium-ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output and power density if it is required by the load device 42.

Accordingly, the lithium-ion battery 20 can generate electric current to a load device 42 that can be operatively connected to the external circuit 40. The load device 42 may be powered fully or partially by the electric current passing through the external circuit 40 when the lithium-ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

Any appropriate electrolyte 30, whether in solid form or solution, capable of conducting lithium ions between the negative electrode 22 and the positive electrode 24 may be used in the lithium-ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium-ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

The positive electrode 24 may be formed from any lithium-based active material that can sufficiently undergo lithium intercalation and deintercalation while functioning as the positive terminal of the lithium-ion battery 20. The positive electrode 24 may include a polymeric binder material to structurally fortify the lithium-based active material. One exemplary common class of known materials that can be used to form the positive electrode 24 is layered lithium transitional metal oxides. For example, in various embodiments, the positive electrode 24 may comprise at least one spinel, like lithium manganese oxide ($Li_{(1+x)}Mn_{(2-x)}O_4$), where 0≤x≤1, where x is typically less than 0.15, including $LiMn_2O_4$, lithium manganese nickel oxide, ($LiMn_{(2-x)}Ni_xO_4$), where 0≤x≤1 and, e.g., $LiMn_{1.5}Ni_{0.5}O_4$, lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where 0≤x≤1, 0≤y≤1, 0≤z≤1, and x+y+z=1, a lithium nickel cobalt metal oxide $LiNi_{(1-x-y)}Co_xM_yO_2$ (wherein 0<x<1, y<1, and M may be Al, Mn, or the like), lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). A variety of other known lithium-based active materials may also be used. By way of non-limiting example, alternative materials may include lithium nickel oxide ($LiNiO_2$), lithium aluminum manganese oxide ($Li_xAl_yMn_{(1-y)}O_2$), and lithium vanadium oxide ($LiV_2O_5$). In certain variations, the positive electrode 24 comprises at least one of spinel, such as lithium manganese oxide ($Li_{(1+x)}Mn_{(2-x)}O_4$), lithium manganese nickel oxide, ($LiMn_{(2-x)}Ni_xO_4$), where 0≤x≤1, lithium manganese nickel cobalt oxide, (e.g., $LiMn_{1/3}Ni_{1/3}Co_{1/3}O_2$), or lithium iron phosphate ($LiFePO_6$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In various aspects, the negative electrode 22 includes an electroactive material as a lithium host material capable of functioning as a negative terminal of a lithium-ion battery. The negative electrode 22 may also include another electrically conductive material, as well as one or more polymeric binder materials to structurally hold the lithium host material together. For example, in one embodiment, the negative electrode 22 may be formed from lithium titanate oxide (LTO) particles intermingled in at least one of polyvinylidene fluoride (PVDF), a nitrile butadiene rubber (NBR), styrene-butadiene rubber (SBR) binder, or carboxymethoxyl cellulose (CMC) as will be discussed in greater detail below, by way of non-limiting example. The negative electrode current collector 32 may be formed from copper or any other appropriate electrically conductive material known to those of skill in the art.

In various aspects of the present disclosure, the negative electrode 22 comprises an active material comprising $Li_4Ti_5O_{12}$ (LTO) modified in accordance with certain principles of the present teachings. LTO is capable of sufficiently undergoing lithium intercalation or alloying and de-intercalation or dealloying, while functioning as the negative terminal of the lithium-ion battery 20. When LTO is intercalated or alloyed with lithium ions, it transitions from $Li_4Ti_5O_{12}$ to $Li_{4+x}Ti_5O_{12}$, where x ranges from 0≤x≤3 (where LTO in a fully intercalated or alloyed form is $Li_7Ti_5O_{12}$). As discussed previously, LTO is particularly useful as a negative electrode 22 active material, because it has outstanding electrochemical performance and furthermore has little to no volumetric change after lithium insertion. Thus, it is considered a zero-strain material providing superior long term stability.

Hence, LTO is a promising electrode material for lithium battery, due to its excellent cycling stability, current efficiency, rate capability. Furthermore, LTO can be designed as a nano-structured material for higher packing density and very high rate capacities. However, as discussed previously, one potential shortcoming to using LTO as a negative electrode 22 is that it appears that over time, at relatively high temperatures, and under certain charge conditions, LTO can generate significant amounts of gas within an electrochemical cell. As lithium-ion cells are typically hermetically sealed, such gas generation over time is undesirable. The predominant component in the gas generated by LTO in a lithium-ion battery is hydrogen ($H_2$), the generation of which appears to increase with temperature and state of charge (S-OC). LTO and the typical active materials for cathodes (e.g., ($Li_{(1+x)}Mn_{(2-x)}O_4$) do not themselves contain a source of hydrogen and thus do not by themselves generate hydrogen. Furthermore, while lithium electrolytes have a source of hydrogen (e.g., from non-aqueous solvents, like alkyl carbonates), the electrolytes are typically stable at ambient temperatures. The issue of gas generation seems to be specific to use of LTO or similar materials as negative electrode active materials, while changing the cathode active materials does not mitigate generation of the gas.

While not limiting the present teachings to any particular theory, it is theorized that components in the electrolyte solution can break down and form species that react with active metal oxides (LTO) to form hydrogen gas and other undesirable byproducts. For example, where an electrolyte comprises lithium hexafluorophosphate ($LiPF_6$), it can disassociate into LiF and $PF_5$ at high voltages (e.g., around 2.6V versus Li). $PF_5$ is a strong Lewis acid, which reacts with and consumes lithium ions in the electrochemical cell. Further, HF can be generated by undesirable reactions between certain electrolyte components and active hydroxides in LTO. This results in LTO reacting with electrolyte and consuming lithium to undesirably diminish battery capacity.

To address these issues, batteries incorporating LTO negative electrodes may be subjected to an aging process prior that involves heating the battery for a predetermined period to improve capacity retention and reduce gas formation. For example, a battery having an LTO electrode can be aged at about 70° C. for a week at 100% state of charge (SOC)/applied potential in one exemplary heated aging process. However, such heat-driven aging can undesirably reduce initial battery capacity by about 10% or more by consuming active lithium in the battery.

In various aspects, the present disclosure provides methods for making an electroactive material for an electrochemical cell. The method comprises pretreating an electroactive material comprising $Li_{(4+x)}Ti_5O_{12}$ (LTO), where $0 \leq x \leq 3$, by contacting a surface of the electroactive material with a pretreatment composition. The pretreatment composition thus forms a protective surface coating on the surface of the electroactive material. In this manner, the pretreated LTO having the protective coating can be subsequently incorporated into a lithium-ion electrochemical cell, while retaining high capacity and having minimal reactivity with the electrolyte to diminish or suppress formation of any gases during use.

In one variation, a method of making an electroactive material for an electrochemical cell is provided. The method comprises pretreating an electroactive material comprising $Li_{(4+x)}Ti_5O_{12}$ (LTO), where $0 \leq x \leq 3$, by contacting a surface of the electroactive material with a pretreatment composition. The pretreatment composition may comprise a lithium fluoride salt. In certain aspects, the lithium fluoride salt can be selected from the group consisting of: lithium hexafluorophosphate ($LiPF_6$), lithium tetrafluoroborate ($LiBF_4$), and combinations thereof. In certain variations, the pretreatment composition may comprise a solvent. In certain variations, the solvent is a non-aqueous solvent. The solvent may include an alkyl carbonate, such as cyclic carbonates (ethylene carbonate (EC), propylene carbonate (PC), butylene carbonate (BC)) and/or an acyclic carbonate (dimethyl carbonate (DMC), diethyl carbonate (DEC), ethylmethylcarbonate (EMC)).

In certain variations, the electroactive material comprising LTO may have an oxide-coated layer, which may use oxides (e.g., silicon dioxide ($SiO_2$) or silicon oxide ($SiO_x$)) coated LTO as active material, which can form a protective coating (e.g., comprising $P_xO_yF_z$) by reacting with the pretreatment composition without consuming the LTO active material.

After contact with one or more exposed surface regions of the electroactive material, a protective surface coating is formed on the one or more exposed surface regions of the electroactive material. In certain aspects, one or more constituents of the lithium fluoride salt react with the LTO to form the protective surface coating. The protective coating may be multiple layers or may be a single layer. In certain aspects, the protective coating may be a hybrid coating having multiple layers with distinct compositions. For example, while not limiting the present disclosure to any particular theory, it is believed that the following reactions represented by Equations 1 and 2 below occur when $LiPF_6$ is present to form the protective coating in such a variation.

$$LiPF_6 \rightarrow LiF + PF_5 \qquad (Eqn.\ 1)$$

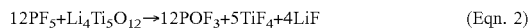

$$12PF_5 + Li_4Ti_5O_{12} \rightarrow 12POF_3 + 5TiF_4 + 4LiF \qquad (Eqn.\ 2)$$

Further, in a variation where $LiBF_4$ is present, it is believed that the following reactions represented by Equations 3 and 4 below occur to form the protective coating.

$$LiBF_4 \rightarrow LiF + BF_3 \qquad (Eqn.\ 3)$$

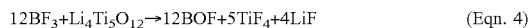

$$12BF_3 + Li_4Ti_5O_{12} \rightarrow 12BOF + 5TiF_4 + 4LiF \qquad (Eqn.\ 4)$$

Thus, the protective surface coating may comprise fluorine, oxygen, and at least one element selected from the group consisting of: phosphorus, boron, and combinations thereof. The protective coating may also comprise titanium.

In certain aspects, the protective surface coating comprises a compound represented by $M_aP_xO_yF_z$, where when P in the formula is normalized to 1 so that x is equal to about 1 (x=1), $0 < y \leq 4$, $0 < z \leq 6$, $0 \leq a \leq 3$. M is selected from the group of elements: lithium (Li), sodium (Na), potassium (K), magnesium (Mg), calcium (Ca), barium (Ba), titanium (Ti), aluminum (Al), and combinations thereof.

In one variation, the protective surface coating comprises a compound represented by $P_xO_yF_z$, where when P in the formula is normalized to 1 so that x is equal to about 1 (x=1), and $0 < y \leq 4$, $0 < z \leq 6$. Notably, no metal M is present in this compound, so a=0 in the formula above. In certain variations, the protective surface coating comprising the compound represented by $P_xO_yF_z$ comprises fluorine (F) at greater than or equal to about 19% by weight to less than or equal to about 67% by weight. In one variation, the protective coating may also include titanium tetrafluoride ($TiF_4$).

In another variation, the protective surface coating comprises a compound represented by $M_aP_xO_yF_z$, where when P in the formula is normalized to 1 so that x is equal to about 1 (x=1), where $0 < y \leq 4$, $0 < z \leq 6$, $0 < a \leq 3$. M is selected from the group of elements: lithium (Li), sodium (Na), potassium (K), magnesium (Mg), calcium (Ca), barium (Ba), titanium (Ti), aluminum (Al), and combinations thereof. Such a compound is a salt of a fluorophosphoric acid. In certain variations, the protective surface coating including the compound represented by $M_aP_xO_yF_z$ comprises fluorine (F) at greater than or equal to about 6% by weight to less than or equal to about 59% by weight. In one variation, such a protective coating may also include titanium tetrafluoride ($TiF_4$).

In certain aspects, the protective surface coating comprises a first compound represented by $P_xO_yF_z$, a second compound represented by $M_aP_xO_yF_z$, or a combination of the first compound and the second compound, so that where P is normalized to 1 so that x is equal to about 1 (x=1), then $0 \leq a \leq 3$, $0 < y \leq 4$, $0 < z \leq 6$, and M is selected from the group of elements: lithium (Li), sodium (Na), potassium (K), magnesium (Mg), calcium (Ca), barium (Ba), titanium (Ti), aluminum (Al), and combinations thereof.

In another variation, the protective surface coating comprises a compound represented by $B_xO_yF_z$, where when B is normalized to 1 so that x is equal to about 1 (x=1), where $0 < y \leq 4$ and $0 < z \leq 4$. The compound may further include M selected from the group of elements: lithium (Li), sodium (Na), potassium (K), magnesium (Mg), calcium (Ca), barium (Ba), titanium (Ti), aluminum (Al), and combinations thereof. In such a variation, the protective coating may also include titanium tetrafluoride ($TiF_4$).

It should be noted that oxides, like silicon oxides, coated on a surface of an LTO particle also are reactive with certain species and form $P_xO_yF_z$ without consuming LTO, and thus when present can contribute to the reactions and formation of the protective coatings.

In various aspects, the protective surface coating is a thin layer applied to one or more preselected surface regions of the electroactive material comprising lithium titanate, which provides sufficient coverage of the exposed surface regions of LTO to minimize adsorption and/or reaction of solvents and other hydrogen source species in the battery cell, while minimizing electrical impedance at the electroactive material surface. The protective surface coating may cover greater than or equal to about 70% of the exposed surface area of the electroactive material, optionally greater than or equal to about 75%, optionally greater than or equal to about 80%, optionally greater than or equal to about 85%, optionally greater than or equal to about 90%, optionally greater than or equal to about 95%, optionally greater than or equal to about 97%, optionally greater than or equal to about 98%, optionally greater than or equal to about 99%, and in certain variations, optionally greater than or equal to about 99.5% of the exposed surface area of the electroactive material.

A thickness of the surface coating may be considered to be the region of the surface of the LTO that has reacted with the precursors of the surface coating to form a distinct chemical composition. In certain variations, an overall thickness of the surface coating (including multiple layers) on the electroactive material is greater than or equal to about 1 nm to less than or equal to about 1 micrometers (μm), optionally greater than or equal to about 3 nm to less than or equal to about 75 micrometers (μm), and in certain aspects, optionally greater than or equal to about 5 nm to less than or equal to about 50 micrometers (μm).

In certain aspects, the lithium fluoride salt is present in the pretreatment composition at greater than or equal to about 0.1% by weight to less than or equal to about 15% by weight, optionally at greater than or equal to about 0.1% by weight to less than or equal to about 10% by weight. The solvent may be present in the pretreatment composition at greater than or equal to about 85% by weight to less than or equal to about 99.9% by weight, optionally at greater than or equal to about 90% by weight to less than or equal to about 99.9% by weight. In certain aspects, the pretreating to form the protective surface coating occurs without any applied electric potential (e.g., external applied voltage or external applied current).

Figure 2:
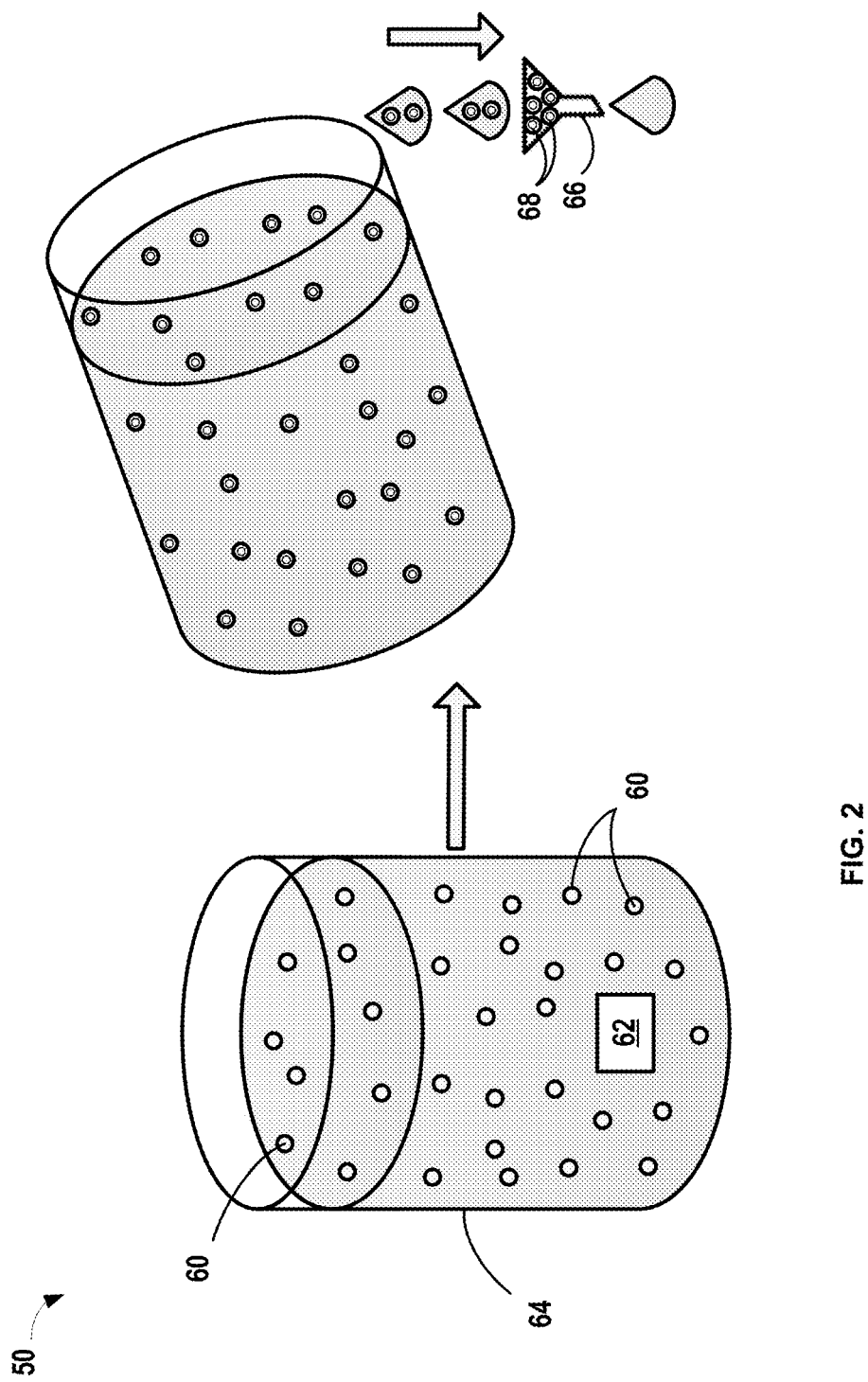
FIG. 2 is a schematic showing a simplified batch process for pretreating a plurality of electroactive material particles comprising lithium titanate oxide (LTO) to have a protective coating according to certain aspects of the present disclosure.

In one variation, shown in FIG. 2, the method is conducted in a batch process 50. The electroactive materials comprising LTO are in the form of particles 60. The pretreating process may include introducing the particle 60 into a pretreatment liquid 62. The pretreatment liquid 62 and particles 60 may be mixed in a vessel 64 and heat may be applied to facilitate reaction between the reactive compounds in the pretreatment liquid 62 and the LTO in particles 60. The reaction may be conducted for a predetermined time and at a predetermined temperature. The predetermined time for reaction depends on the rate of reaction, concentration of reactive precursors, and temperature, but may vary from greater than or equal to about 30 minutes to less than or equal to about 72 hours by way of example. Suitable temperatures for the pretreatment process may be greater than or equal to about 50° C. In certain variations, the temperature may be greater than or equal to about 50° C. to less than or equal to about 700° C., optionally greater than or equal to about 100° C. to less than or equal to about 600° C.

It should be noted that in contrast to the aging process that is conducted for an LTO active material that is fully assembled in an electrochemical cell (e.g., having both electrodes, separator, and electrolyte), the present methods pretreat the electroactive material to form a coating external to the electrochemical cell. Thus, the temperatures that can be used may be far greater in the pretreatment process according to the present disclosure due to the absence of temperature sensitive components like the polymeric separator and polymeric binders. Furthermore, the pretreatment process does not reduce an amount of lithium from the electrolyte, as occurs otherwise during the aging process. As such, the methods of the present disclosure do not consume active lithium in the cell and thus do not sacrifice initial capacity.

After a protective coating is formed on the exposed surfaces of the particle 60, the particles 60 may be separated from the pretreatment liquid 62 by a separation process, such as filtration with a filter 66. A plurality of coated electroactive material particles 68 is collected. If necessary, an optional washing step may be conducted to remove residual solvent on the active material surface. The pretreatment process may be repeated, if necessary to build additional or thicker layers on the electroactive material particles. Various reactor vessels and separation devices may be used as known in the art, including free standing devices, beds, packed beds, sieves, dryers, and the like. It should be noted that the exemplary process in FIG. 2 is merely a simplified representation and may include various other configurations and components, such as valves, gauges, pumps, heat sources, and other equipment not shown. The plurality of coated electroactive material particles 68 can then be used in a subsequent electrode formation process.

An electrode may then be made by mixing the electrode active material, such as the coated LTO powder or particles, into a slurry with a polymeric binder compound, a non-aqueous solvent, optionally a plasticizer, and optional electrically conductive particles. Negative electrodes may comprise about 50% to about 90% of an electroactive material (e.g., particles of LTO), about 5% to about 30% of an electrically conductive material, and a balance binder. Suitable electrically conductive materials include carbon black, graphite, powdered nickel, metal particles, conductive polymers, and combinations thereof and mixtures thereof. Useful binders may comprise a polymeric material and extractable plasticizer suitable for forming a bound porous composite, such as halogenated hydrocarbon polymers (such as poly (vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

The slurry can be mixed or agitated, and then thinly applied to a substrate via a doctor blade. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calendar it. In other variations, the film may be air-dried at moderate temperature to form self-supporting films. If the substrate is removable, then it is removed from the electrode film that is then further laminated to a current collector. With either type of substrate it may be necessary to extract or remove the remaining plasticizer prior to incorporation into the battery cell.

Figure 3:
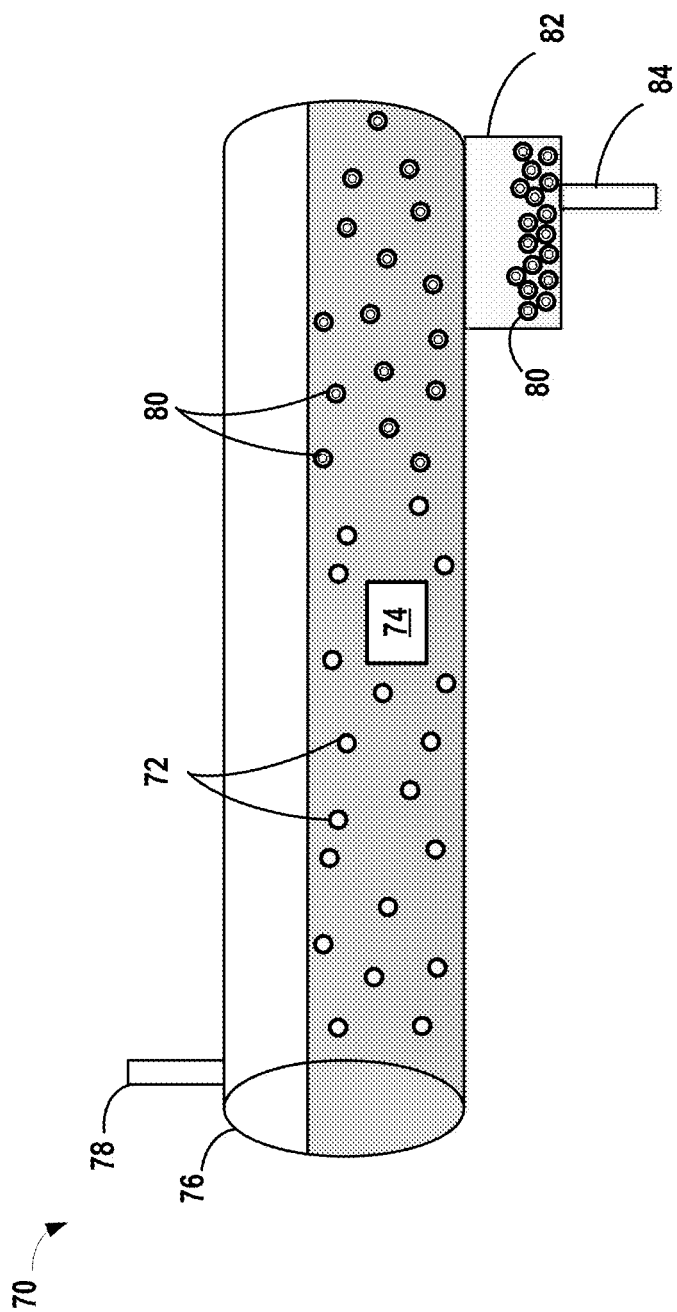
FIG. 3 is a schematic showing a simplified continuous process for pretreating a plurality of electroactive material particles comprising lithium titanate oxide (LTO) in a continuous flow reactor to have a protective coating according to certain aspects of the present disclosure.

In another variation shown in FIG. 3, the method is conducted in a continuous flow process 70. It should be noted that the exemplary process in FIG. 3 is a simplified representation and may include various other components, such as valves, gauges, pumps, heat sources, and other equipment not shown. Aspects of the continuous flow process 70 that are the same as those of the batch process 50 will not be repeated herein for brevity. The electroactive materials comprising LTO are in the form of particles 72. The pretreating process may include introducing the particles 72 into a pretreatment liquid 74. The pretreatment liquid 74 and particles 72 may be mixed in a vessel 76 like a continuous flow reactor. The vessel 76 includes at least one inlet 78 to introduce the pretreatment liquid 74 and/or the particles 72.

While not shown, two distinct inlets may introduce the particles 72 separately from the pretreatment liquid 74 in an alternative design.

The vessel 76 may be continuously stirred or agitated and may have a source of heat that is applied to facilitate reaction between the reactive compounds in the pretreatment liquid 74 and the LTO in particles 72. The size and flow rate within the vessel 76 thus provide an appropriate residence time for the particles within the reactor to react and form a plurality of coated particles 80. Residence time (τ) may be determined by mass of the particles in the reactor (m) divided by the flow rate within the reactor $$(q)\left(\tau = \frac{m}{q}\right).$$

The residence time for reaction depends on the rate of reaction, concentration of reactive precursors, and temperature, but may vary from greater than or equal to about 10 minutes to less than or equal to about 72 hours by way of example.

Suitable temperatures for the pretreatment process may similar to those described in the context of the batch process, for example, greater than or equal to about 50° C. In certain variations, the temperature may be greater than or equal to about 50° C. to less than or equal to about 700° C., optionally greater than or equal to about 100° C. to less than or equal to about 600° C.

After a protective coating is formed on the exposed surfaces of the particles 72, the coated particles 80 may be separated from the pretreatment liquid 74 by a separation process, such as filtration to collect the particles in a receptacle 82. The coated particles 80 are separated from a liquid effluent exiting the vessel 76 via at least one outlet 84. One or multiple filters can be placed in the flow reactor vessel 76 along the solvent flow pass to collect coated particles 80 after reaction. While not shown, two distinct outlets may be employed to remove and separate the coated particles 80 from the pretreatment liquid 74 in an alternative design. A plurality of coated electroactive material particles 80 is collected. If necessary, an optional washing step may be conducted to remove residual solvent on the active material surface. The plurality of coated electroactive material particles 80 can then be used in a subsequent electrode formation process.

In another variation shown in FIG. 4, a process 90 pretreats an electroactive material that is in a form of a plurality of LTO particles 92 contained in a pre-fabricated electrode layer 94. Aspects of process 90 that are shared with the continuous flow process 70 in FIG. 3 and batch process 50 in FIG. 2 will not be repeated herein for brevity. The pre-fabricated electrode layer 94 may be formed as described above with the components described above, including electroactive material particles, a polymeric binder compound, and optional electrically conductive particles. The pre-fabricated electrode layer 94 is disposed on a current collector 96. The pre-fabricated electrode layer 94 also includes a plurality of electrically conductive particles 98, such as carbon black particles. The electrically conductive particles 98 and the LTO particles 92 may be distributed in a polymeric binder 100.

The pretreating process may include contacting the pre-fabricated electrode layer 94 containing the LTO particles 92 with a pretreatment liquid 102. The pretreatment liquid 102 may be poured over the prefabricated electrode layer 94.

Thus, the pretreatment liquid composition 102 is applied to at least one exposed surface of the electroactive LTO particles 92 in the pre-fabricated electrode layer 94. Heat may be applied to facilitate reaction between the reactive compounds in the pretreatment liquid 102 and the LTO particles 92. The reaction may be conducted for a predetermined time and at a predetermined temperature like those discussed above in the context of FIG. 2. A protective coating is thus formed on the surface of the pretreated electrode as well as any exposed surfaces of the LTO particles 92 within the prefabricated electrode layer 94.

Where the electroactive materials are contained in a pre-fabricated electrode layer, the pretreating may also include applying the pretreatment composition to the exposed surfaces of the electroactive material in the pre-fabricated electrode layer by of the following processes: roller coating, dip coating, spray, physical vapor deposition, sputter deposition, roll-to-roll coating, chemical vapor deposition, atomic layer deposition, plasma deposition, slurry coating by traditional slot die or comma bar coater, and the like.

Exemplary particles of $Li_{(4+x)}Ti_5O_{12}$, where $0 \leq x \leq 3$ (LTO) pretreated according to the present disclosure are shown as LTO particles 150 in FIG. 5. Each LTO particles 152 is shown with coatings having a particular configuration and orientation that are believed to form, although the configuration is not limiting and may differ from that shown. A first coating 160 is disposed on an exposed surface 162 of the LTO particles 152. The first coating 160 may also comprise titanium and fluorine. In one aspect, the first coating 160 may comprise titanium tetrafluoride ($TiF_4$). A second coating 166 is disposed over the first coating 160. The second coating 166 has a distinct composition from the first coating 160. The second coating 166 may comprise fluorine, oxygen, and at least one element selected from the group consisting of: phosphorus, boron, and combinations thereof. In one variation, the protective second coating 166 comprises a compound represented by $M_aP_xO_yF_z$, where when P in the formula is normalized so that x is equal to about 1, $0 \leq a \leq 3$, $0 < y \leq 4$, $0 < z \leq 6$. In another variation, the second coating 166 comprises a compound represented by $B_xO_yF_z$, where when B is normalized to 1, so that x is equal to about 1, $0 < y \leq 4$, and $0 < z \leq 4$. The second coating 166 may also include combinations of $P_xO_yF_z$ and $B_xO_yF_z$. In certain aspects, the first coating 160 comprising titanium and fluorine, for example, $TiF_4$, is believed to protect the electroactive material comprising LTO against attack from hydrogen fluoride (HF). The second coating 166 comprising fluorine, oxygen, phosphorus and/or boron, for example, $P_xO_yF_z$ and/or $M_aP_xO_yF_z$, is believed to stabilize the LTO material surface to reduce electrolyte decomposition (when the coated electroactive materials are incorporated into an electrochemical cell and placed in contact with electrolyte) and therefore gas production. In this manner, a protective coating system provided by certain aspects of the present disclosure protects the underlying LTO active material from HF and $PF_5$ attack. Suppression of such gas generated from LTO can further improve the safety and life of lithium-ion batteries.

In other variations, the present disclosure provides yet another method of making an electroactive material for an electrochemical cell. The method may comprise pretreating an electroactive material comprising $Li_{(4+x)}Ti_5O_{12}$ (LTO), where $0 \leq x \leq 3$. The pretreating includes contacting a surface of the electroactive material with one or more organophosphorus compounds to form a protective surface coating on the surface of the electroactive material. The organophosphorus compound may be represented by $M_aP_xO_yF_zC_nH_m$, where P is normalized, so that x is equal to about 1 (x=1) and the following also apply: 0<a≤3, 0<y≤4, 0≤z≤6, 0<n≤20, 0≤m≤42, and M is selected from the group of elements: lithium (Li), sodium (Na), potassium (K), magnesium (Mg), calcium (Ca), barium (Ba), titanium (Ti), aluminum (Al), and combinations thereof.

In one variation, the organophosphorus compound is represented by $P_xO_yF_zC_nH_m$, where when P in the formula is normalized to 1 so that x' is equal to about 1 (x'=1), 0<y≤4, 0≤z≤6, 0<n≤20, and 0≤m≤42. Notably, no metal M is present in this compound, so a=0 from the formula just above. In certain variations, the organophosphorus compound represented by $P_xO_yF_zC_nH_m$ comprises fluorine (F) at greater than or equal to about 4% by weight to less than or equal to about 50% by weight.

In certain aspects, the organophosphorus compound is selected from the group consisting of: perfluorinated phosphonic acid, methylallyl phosphate, alkyl fluorophosphates, phosphated poly(methyl methacrylate) (PMMA), phosphonated polyimides, (aminomethyl)phosphonic acid, lithium meta phosphate, adenosine diphosphate, phospholipids, and combinations thereof.

In certain aspects, the method may comprise pretreating an electroactive material comprising $Li_{(4+x)}Ti_5O_{12}$ (LTO), where 0≤x≤3 by contacting a pretreatment composition with a surface of the electroactive material to form a protective surface coating on the surface of the electroactive material. The pretreatment composition may comprise the organophosphorus compound. The pretreatment composition may optionally further comprise a solvent. In certain variations, the solvent is a non-aqueous solvent. The solvent may include carbonate-based electrolyte solvents, such as alkyl carbonate, such as cyclic carbonates (ethylene carbonate (EC), propylene carbonate (PC), butylene carbonate (BC)) and/or an acyclic carbonate (dimethyl carbonate (DMC), diethyl carbonate (DEC), ethylmethylcarbonate (EMC)). The solvent may also include non-carbonate based solvents or an aqueous solution, when using an organophosphate salt.

In certain aspects, the organophosphorus compound is present in the pretreatment composition at greater than or equal to about 0.1% by weight to less than or equal to about 15% by weight, optionally at greater than or equal to about 0.1% by weight to less than or equal to about 10% by weight. The solvent may be present in the pretreatment composition at greater than or equal to about 85% by weight to less than or equal to about 99.9% by weight, optionally at greater than or equal to about 90% by weight to less than or equal to about 99.9% by weight.

In certain aspects, the pretreating to form the protective surface coating on the electroactive material surfaces occurs without any applied electric potential (e.g., external applied voltage or external applied current). The protective surface coating may cover the same amounts of exposed surface area and have the same thicknesses and other properties as the previously described embodiments.

The protective surface coating thus formed comprises oxygen, phosphorus, carbon, and hydrogen. In certain aspects, the protective surface coating further comprises fluorine. The protective surface coating may thus comprise an organophosphorus compound represented by $M_aP_xO_yF_zC_nH_m$, where P is normalized, so that x is equal to about 1 (x=1) and the following also apply: 0≤a≤3, 0<y≤4, 0≤z≤6, 0≤n≤20, 0≤m≤42, and M is selected from the group of elements: lithium (Li), sodium (Na), potassium (K), magnesium (Mg), calcium (Ca), barium (Ba), titanium (Ti), aluminum (Al), and combinations thereof.

In one variation, the protective surface coating comprises a compound represented by $P_xO_yF_zC_nH_m$, where when P in the formula is normalized to 1 so that x is equal to about 1 (x=1), 0<y≤4, 0<z≤6, 0≤n≤20, and 0≤m≤42. Notably, no metal M is present in this compound, so a=0 from the formula just above. In certain variations, the organophosphorus compound represented by $P_xO_yF_zC_nH_m$ comprises fluorine (F) at greater than or equal to about 4% by weight to less than or equal to about 50% by weight.

In certain variations, the electroactive material is: (i) in a form of a plurality of LTO particles and the pretreating comprises mixing the plurality of LTO particles with the pretreatment composition, wherein after the protective coating is formed on the surface, the plurality of LTO particles are used to form a negative electrode; or (ii) contained in a pre-fabricated electrode layer and the pretreating comprises applying the pretreatment composition to at least one exposed surface of the pre-fabricated electrode layer. The pretreatment may be conducted by any of the processes as described previously above where a pretreatment composition comprising organophosphorus is used. Where the electroactive materials are in the form of particles or a powder, the pretreating may also include applying the organophosphorus compound by of the following processes: dip coating, physical vapor deposition, sputter deposition, spray, chemical and electrochemical techniques, chemical vapor deposition, atomic layer deposition, and plasma deposition.

Where the electroactive materials are contained in a pre-fabricated electrode layer, the pretreating may also include applying the organophosphorus compound to the exposed surfaces of the electroactive material in the pre-fabricated electrode layer by of the following processes: roller coating, dip coating, spray, physical vapor deposition, sputter deposition, roll-to-roll coating, chemical vapor deposition, atomic layer deposition, plasma deposition, slurry coating by traditional slot die or comma bar coater, and the like.

The present disclosure provides an electroactive material for an electrochemical cell comprising $Li_{(4+x)}Ti_5O_{12}$, where 0≤x≤3 (LTO). Thus, in certain variations, the electroactive material has a protective surface coating formed thereon that may comprise a compound represented by $M_aP_xO_yF_zC_nH_m$ and/or $M_aP_xO_yF_z$, where when P is normalized to 1, so that x is equal to about 1 (x=1) the following also apply: 0≤a≤3, 0<y≤4, 0<z≤6, 0<n≤20, 0<m≤42, and M is selected from the group of elements: lithium (Li), sodium (Na), potassium (K), magnesium (Mg), calcium (Ca), barium (Ba), titanium (Ti), aluminum (Al), and combinations thereof.

The protective surface coating may be applied to any surface of the LTO that may be exposed to electrolyte or solvent within the electrochemical cell to minimize reaction and/or adsorption of undesirable species. The protective surface coating may cover greater than or equal to about 70% of exposed surface regions of the electroactive material. The $M_aP_xO_yF_zC_nH_m$ and/or $M_aP_xO_yF_z$ compound as described above stabilizes the exposed surfaces of the electroactive material comprising LTO and thus serves to reduce electrolyte decomposition and gas generation. This serves to improve the safety and battery life when using LTO as the negative electrode active material. This is especially advantageous to improve useful life for start-stop lithium-ion batteries.

A battery may have a laminated cell structure, comprising an anode layer, a cathode layer, and electrolyte/separator between the anode and cathode layers. The anode and cathode layers each comprise a current collector. A negative anode current collector may be a copper collector foil, which may be in the form of an open mesh grid or a thin film. The current collector can be connected to an external current collector tab.

The present disclosure contemplates a lithium-ion electrochemical cell or battery comprising the electroactive material having a protective surface coating formed thereon that may comprise a compound represented by $M_aP_xO_yF_zC_nH_m$ compound and/or $M_aP_xO_yF_z$ compound, as described above. The electrochemical cell also has a positive electrode, a separator, and an electrolyte comprising lithium hexafluorophosphate ($LiPF_6$) lithium tetrafluoroborate ($LiBF_4$), and combinations thereof. In certain aspects, any electroactive material comprising LTO that is exposed to electrolyte in the electrochemical cell has a protective surface coating formed thereon.

For example, in certain variations, an electrode membrane, such as an anode membrane, comprises the electrode active material (e.g., LTO) dispersed in a polymeric binder matrix over a current collector. The separator can then be positioned over the negative electrode element, which is covered with a positive electrode membrane comprising a composition of a finely divided lithium insertion compound in a polymeric binder matrix. A positive current collector, such as aluminum collector foil or grid completes the assembly. Tabs of the current collector elements form respective terminals for the battery. A protective bagging material covers the cell and prevents infiltration of air and moisture. Into this bag, an electrolyte is injected into the separator (and may also be imbibed into the positive and/or negative electrodes) suitable for lithium ion transport. In certain aspects, the laminated battery is further hermetically sealed prior to use.

In this manner, the protective surface coating is capable of suppressing greater than or equal to about 50% of gases that would otherwise be generated by a comparative electroactive material comprising LTO that is the same as the LTO on which the protective surface coating is formed, but that lacks the protective surface coating. In certain aspects, the surface coating suppresses greater than or equal to about 60%, optionally 65%, optionally 70%, optionally 75%, optionally 80%, optionally 85%, optionally 90%, optionally 95%, optionally 97%, optionally 98%, optionally 99%, optionally 99.5%, optionally 99.7%, optionally 99.8%, optionally 99.9%, and in certain aspects, 99.99% of gases that would otherwise be generated by a comparative bare LTO material that lacks the inventive protective surface coating, but otherwise has the same composition and properties.

In certain aspects, it is preferred that an electroactive material having a protective surface coating for suppressing gas formation in an electrochemical cell, such as a lithium-ion battery, comprising LTO for example, does not generate any or only minimal amounts of gaseous compounds during the life of the battery. For example, in certain aspects, an electrochemical cell or lithium-ion battery comprising an electroactive material having a surface coating according to certain variations of the present disclosure is substantially free of gaseous compounds through the life of the electrochemical cell or battery. "Substantially free" is intended to mean that the compound is absent to the extent that it cannot be detected or that if the compound is present, it does not cause undue detrimental impact and/or prevent the overall use of the battery for its intended purpose. In some aspects, it is preferred that a concentration of gaseous compounds generated in the electrochemical cell is less than about 1,000 parts per million (ppm), optionally less than about 500 ppm, optionally less than about 100 ppm, optionally less than about 75 ppm, and in some preferred aspects, optionally less than about 50 ppm when the electrochemical cell or battery is stored over time. In some aspects, it is preferred that the gases generated correspond to less than or equal to about 0.1% of the sealed cell volume when the gas volume is evaluated at standard temperature and pressure (298 K, 1 atm) conditions, for example, after 100 hours of storage or more; optionally less than or equal to about 0.05% of the sealed cell volume; and in certain aspects, optionally less than or equal to about 0.01% of the sealed cell volume at standard temperature and pressure conditions.

In certain aspects, the lithium-ion electrochemical cell incorporating an inventive pretreated electroactive material having a protective surface coating for suppressing gas formation has a rate capacity of greater than or equal to about 0.05 C (C/20) and greater than or equal to about 20 Coulombs, where the lithium-ion electrochemical cell is substantially free of gas generation for a standard lifetime of the electrochemical cell.

In one aspect, the lithium-ion electrochemical cell has an initial charge capacity of greater than or equal to about 0.117 A·h.

In certain variations, a lithium-ion battery incorporating a pretreated electroactive material having a protective surface coating for suppressing gas formation prepared in accordance with certain aspects of the present disclosure is substantially free of gaseous species for at least 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling). In certain variations, a lithium-ion battery incorporating a pretreated electroactive material having a protective surface coating for suppressing gas formation prepared in accordance with certain aspects of the present disclosure is substantially free generated gaseous species for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years.

Stated in another way, in certain aspects, a lithium-ion battery or electrochemical cell incorporating the lithium-ion battery incorporating a pretreated electroactive material having a protective surface coating for suppressing gas formation prepared in accordance with certain aspects of the present disclosure will be substantially free of gaseous species for at least 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

Methods according to certain aspects of the present disclosure form a protective coating on LTO materials or an LTO electrode that improves battery life and reduces gassing. The protective coating reduces electrolyte decomposition and gas formation during LTO battery operation. Further, the protective coating increases cell capacity by reducing loss of cyclable lithium that occurs during battery formation. The passivated LTO with surface protection can thus serve to increase battery capacity and improve battery life, thus reducing weight and/or increasing vehicle range.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making an electroactive material for an electrochemical cell, the method comprising:
pretreating an electroactive material comprising $Li_{(4+x)}Ti_5O_{12}$ (LTO) where $0 \leq x \leq 3$, by contacting a surface of the electroactive material with a pretreatment composition comprising a lithium fluoride salt selected from the group consisting of: lithium hexafluorophosphate ($LiPF_6$), lithium tetrafluoroborate ($LiBF_4$), and combinations thereof, and a solvent to form a protective surface coating on the surface of the electroactive material, wherein the protective surface coating comprises fluorine, oxygen, and at least one element selected from the group consisting of: phosphorus, boron, and combinations thereof, and wherein the protective surface coating covers greater than or equal to about 70% of the surface of the electroactive material.

2. The method of claim 1, wherein the pretreatment composition further comprises a compound including an element M, wherein the protective surface coating comprises a first compound represented by $P_xO_yF_z$, a second compound represented by $M_aP_xO_yF_z$, or a combination of the first compound and the second compound, wherein when P in the formula is normalized so that $x=1$, $0<y\leq4$, $0<z\leq6$, $0<a\leq3$, and M is selected from the group of elements: lithium (Li), sodium (Na), potassium (K), magnesium (Mg), calcium (Ca), barium (Ba), titanium (Ti), aluminum (Al), and combinations thereof.

3. The method of claim 2, wherein the protective surface coating comprises the first compound represented by $P_xO_yF_z$ comprising fluorine (F) at greater than or equal to about 19% by weight to less than or equal to about 67% by weight.

4. The method of claim 2, wherein the protective surface coating comprises the second compound represented by $M_aP_xO_yF_z$ comprising fluorine (F) at greater than or equal to about 6% by weight to less than or equal to about 59% by weight.

5. The method of claim 2, wherein the protective surface coating further comprises titanium tetrafluoride ($TiF_4$).

6. The method of claim 1, wherein the protective surface coating comprises a compound represented by $B_xO_yF_z$, wherein when B in the formula is normalized to 1 so that x equals about 1, $0<y\leq4$ and $0<z\leq4$.

7. The method of claim 6, wherein the protective surface coating further comprises titanium tetrafluoride ($TiF_4$).

8. The method of claim 1, wherein the lithium fluoride salt is present in the pretreatment composition at greater than or equal to about 0.1% by weight to less than or equal to about 15% by weight.

9. The method of claim 1, wherein the pretreating to form the protective surface coating occurs without any applied electric potential or current.

10. The method of claim 1, wherein the electroactive material is in a form of a plurality of LTO particles and the pretreating comprises mixing the plurality of LTO particles with the pretreatment composition, wherein after the protective coating is formed on the surface, the plurality of LTO particles is used to form a negative electrode.

11. The method of claim 1, wherein the LTO is contained in a pre-fabricated electrode layer and the pretreating comprises applying the pretreatment composition to at least one exposed surface of the pre-fabricated electrode layer.

12. A method of making an electroactive material for an electrochemical cell, the method comprising:
pretreating an electroactive material comprising $Li_{(4+x)}Ti_5O_{12}$ (LTO), where $0 \leq x \leq 3$, by contacting a surface of the electroactive material with a pretreatment composition comprising an organophosphorus compound represented by $M_aP_xO_yF_zC_nH_m$, wherein when $x=1$, $0\leq a\leq3$, $0<y\leq4$, $0\leq z\leq6$, $0\leq n\leq20$, $0\leq m\leq42$, and M is selected from the group of elements: lithium (Li), sodium (Na), potassium (K), magnesium (Mg), calcium (Ca), barium (Ba), titanium (Ti), aluminum (Al), and combinations thereof to form a protective surface coating on the surface, wherein the protective surface coating comprises oxygen, phosphorus, carbon, and hydrogen, and wherein the protective surface coating covers greater than or equal to about 70% of the surface of the electroactive material.

13. The method of claim 12, wherein the organophosphorus compound is selected from the group consisting of: perfluorinated phosphonic acid, methylallyl phosphate, alkyl fluorophosphates, phosphated poly(methyl methacrylate) (PMMA), phosphonated polyimides, (aminomethyl)phosphonic acid, lithium meta phosphate, adenosine diphosphate, phospholipids, and combinations thereof.

14. The method of claim 12, wherein the organophosphorus compound is represented by $P_xO_yF_zC_nH_m$, wherein when $x=1$, $0<y\leq4$, $0<z\leq6$, $0\leq n\leq20$, $0\leq m\leq42$ and comprises fluorine (F) at greater than or equal to about 4% by weight to less than or equal to about 50% by weight.

15. The method of claim 12, wherein the organophosphorus compound is present in the pretreatment composition at greater than or equal to about 0.1% by weight to less than or equal to about 15% by weight.

16. The method of claim 12, wherein the pretreating to form the protective surface coating occurs without any applied electric potential.

17. The method of claim 12, wherein the protective surface coating comprises the organophosphorus compound represented by $M_aP_xO_yF_zC_nH_m$, wherein when $x=1$, $0\leq a\leq3$, $0<y\leq4$, $0<z\leq6$, $0\leq n\leq20$, $0\leq m\leq42$, and M is selected from the group of elements: lithium (Li), sodium (Na), potassium (K), magnesium (Mg), calcium (Ca), barium (Ba), titanium (Ti), aluminum (Al), and combinations thereof to form a protective surface coating on the surface.

18. The method of claim 12, wherein the electroactive material is:
(i) in a form of a plurality of LTO particles and the pretreating comprises mixing the plurality of LTO particles with the pretreatment composition, wherein after the protective coating is formed on the surface, the plurality of LTO particles are used to form a negative electrode; or
(ii) contained in a pre-fabricated electrode layer and the pretreating comprises applying the pretreatment composition to at least one exposed surface of the pre-fabricated electrode layer.

19. An electroactive material for an electrochemical cell comprising:
$Li_{(4+x)}Ti_5O_{12}$, where $0\leq x\leq3$ (LTO); and
a protective surface coating formed thereon comprising a compound represented by $M_aP_xO_yF_zC_nH_m$, wherein when x=1, $0 \leq a \leq 3$, $0 < y \leq 4$, $0 < z \leq 6$, $0 \leq n \leq 20$, $0 \leq m \leq 42$, and M is selected from the group of elements: lithium (Li), sodium (Na), potassium (K), magnesium (Mg), calcium (Ca), barium (Ba), titanium (Ti), aluminum (Al), and combinations thereof to form a protective surface coating on the surface, and wherein the protective surface coating covers greater than or equal to about 70% of the surface of the electroactive material.

20. A lithium-ion electrochemical cell comprising the electroactive material of claim 19 as a negative electrode and further comprising:
   a positive electrode;
   a separator; and
   an electrolyte comprising lithium hexafluorophosphate (LiPF$_6$), lithium tetrafluoroborate (LiBF$_4$), and combinations thereof.

* * * * *